United States Patent [19]

Fukazawa et al.

[11] Patent Number: 4,675,395

[45] Date of Patent: Jun. 23, 1987

[54] CYCLODEXTRIN INCLUSION COMPOUND AND PROCESS FOR ITS PREPARATION

[75] Inventors: Ryutaro Fukazawa; Susumu Kodama; Mieko Sato, all of Tokyo, Japan

[73] Assignee: Seiwa Technological Laboratories Limited, Tokyo, Japan

[21] Appl. No.: 774,041

[22] Filed: Sep. 9, 1985

[51] Int. Cl.$^4$ .............................................. C08B 37/16
[52] U.S. Cl. .................................................. 536/103
[58] Field of Search ....................... 426/271; 536/103

[56] References Cited

U.S. PATENT DOCUMENTS 4,228,160  10/1980  Szejtli et al. ................... 536/103 X
4,555,504  11/1985  Jones .............................. 536/103 X

FOREIGN PATENT DOCUMENTS 1021184  1/1986  Japan ................................ 536/103

*Primary Examiner*—Robert Yonooskie
*Attorney, Agent, or Firm*—Frishauf, Holtz, Goodman & Woodward

[57] ABSTRACT

Hinokitiol, which is relatively insoluble in water, can be rendered more soluble by converting it to an inclusion compound in a cyclodextrin. This may be prepared by heating a mixture of hinokitiol and an aqueous solution of cyclodextrin to a temperature above the melting point of hinokitiol and then mixing the heated mixture with a very cold organic liquid to precipitate the inclusion compound.

29 Claims, No Drawings

CYCLODEXTRIN INCLUSION COMPOUND AND PROCESS FOR ITS PREPARATION

BACKGROUND TO THE INVENTION

The present invention relates to a cyclodextrin inclusion compound with hinokitiol and provides a novel and convenient method for preparing this inclusion compound.

Hinokitiol is a 7-membered ring compound which is contained in an acidic oil derived from certain kinds of perennial plant: it may also be synthesized by well-known routes. It was first described as one of the components of an extract from the heart wood of trees of the species *Thuja plicata* and named β-thujaplicin [see. for example. H. Erdtman et al., Nature 161, 719 (1948), H. Erdtman et al., Acta Chem. Scand. 2, 625 (1948) and H. MacLean et al., Anal. Chem. 28, 509 (1956)] but this was subsequently identified with an extract from the heart wood of the Japanese hinoki (*Chamaecyparis obtusa*) which had been named hinokitiol [T. Nozoe, Bull. Chem. Soc. Japan 11, 295 (1936)] and the material is now commonly termed "hinokitiol" although in older literature the term "β-thujaplicin" may be used.

Hinokitiol has strong bactericidal and bacteriostatic activity and has been used medically and in foods, particularly for the preservation of fresh fish. Its use for preventing the discoloration of animal and plant products is described in Japanese patent application Ser. No. 195819/82 and its use as a food preservative is described in Japanese patent application Ser. No. 98976/83.

However, hinokitiol has extremely limited solubility in water; even at a temperature of 25° C. its solubility is only about 0.12%; at the temperature commonly used for preserving fresh fish, which is generally the temperature of an ice-water mixture. i.e. between 0° and 5° C., its solubility is so low as to be insignificant. Hinokitiol is an acidic substance and can, therefore, be converted to alkali metal salts, which do have improved water solubility. However, the use of such alkali metal salts is prohibited in Japan by food health legislation. Common organic solvents in which hinokitiol is soluble cannot be used in the preservation of fish for many reasons: e.g. they may be harmful to health, they may be unacceptable by virtue of their taste or smell or they may harm the texture or flavour of the fish.

Moreover, hinokitiol has a very strong and pronounced odor, which has very seriously limited its use as a food preservative. It would clearly be desirable to provide a composition retaining the desirable properties of hinokitiol but free from this undesirable odor.

There is, therefore, a need for a method of solubilizing hinokitiol by means which will comply with existing legislation, will not give rise to any health hazards or potential health hazards and will not have any adverse effects on fish, the latter becoming of increasing importance as enjoyment of raw fish, such as sushi and sashimi, spreads to Western countries.

We have now discovered that these aims can be achieved by forming an inclusion compound of hinokitiol within cyclodextrin. Surprisingly, as well as having improved solubility, this inclusion compound is free from the strong odor of hinokitiol and can, therefore, be used for the preservation of a wide range of foodstuffs.

Cyclodextrin is a well-known clathrate and it is known that certain compounds of limited water solubility can be made more water-soluble by formation of a cyclodextrin inclusion compound, as described, for example, in: "Inclusion Compounds" by Watabe, Chihara, *Iwanami Gendai Kagaku Koza,* 1956; "Inclusion Compounds and Their Applications" by Seki, *Latest Chemistry and its Application,* Maki Bookstore, 1958; "History of Development of Inclusion Compounds" by Kanaba, *Realm of Chemistry,* Nankodo, 1961; and K. Vekama et al., Chem. Pharm. Bull., 27(2), 398 (1979).

Various processes have been proposed for producing inclusion compounds of substances having limited water solubility within cyclodextrin. For example, where the substance of limited water solubility is a liquid, the substance may be added to an aqueous solution of cyclodextrin and then the resulting mixture stirred, until the inclusion compound is precipitated; the precipitate may then be collected by conventional means. Where the substance of limited water solubility is a solid, one suitable method comprises dissolving the substance in a suitable solvent (for example an ether such as diethyl ether), adding the solution to an aqueous solution of cyclodextrin, shaking and/or stirring the mixture sufficiently until a precipitate of the inclusion compound is formed and then collecting the precipitate. Various other methods are known, for example the "kneading method". In this method, the substance in question is added to a slurry of β-cyclodextrin and the mixture is kneaded until homogeneous, whereupon water is added to separate the inclusion compound. Hinokitiol, however, is so insoluble in water that this method cannot, in practice, be used.

Recently, in Japanese patent Publication No. 35968/83, there has been proposed a process for collecting an inclusion compound by freeze-drying a mixture. However, the cost of installation and running of a freeze-drying plant is too great for its use to be an economic proposition for the preparation of a relatively low value-added product such as a hinokitiol composition. Accordingly, none of these known processes has been found to be particularly satisfactory for manufacturing a cyclodextrin inclusion compound of hinokitiol for use in food processing.

BRIEF SUMMARY OF INVENTION

It is, therefore, an object of the present invention to provide an inclusion compound of hinokitiol within a cyclodextrin.

It is a further object of the invention to provide a method of producing such an inclusion compound which can be carried out simply and safely.

It is a still further object of the invention to provide a method of preserving the freshness of fish by incorporation therein of such an inclusion compound.

DETAILED DESCRIPTION OF INVENTION

In general terms, the inclusion compound may be prepared by: forming a heated mixture of an aqueous solution of a cyclodextrin with hinokitiol at a temperature higher than the temperature at which hinokitiol melts; mixing the heated mixture with a water-soluble cold organic liquid which does not form an inclusion compound with the cyclodextrin or which forms a weaker inclusion compound with the cyclodextrin than does hinokitiol, to precipitate the inclusion compound of hinokitiol within cyclodextrin; and collecting the precipitate.

In one embodiment of this process, during or after heating the mixture of hinokitiol and the aqueous solution of cyclodextrin, the molten hinokitiol is physically dispersed within the aqueous solution, e.g. by stirring or by ultrasonic mixing.

In this process, the addition of the water-soluble cold organic liquid takes place after heating the mixture of the aqueous solution of cyclodextrin with hinokitiol and, if desired, the mixture may be cooled or allowed to cool prior to addition of the organic liquid, e.g. to a temperature between ambient and 0° C. Alternatively, addition of the cold organic liquid may take place whilst the mixture is still hot. If desired, the heating of the mixture of the aqueous solution of cyclodextrin with hinokitiol may be effected by adding hinokitiol to a preheated solution of the cyclodextrin. There is no particular limitation on the heating temperature, provided that it is a temperature at which hinokitiol melts or above, i.e. about 50° C. or above; clearly, however, the temperature should not be above the boiling point of the mixture. If a comparatively high temperature is employed, then the fluidity of the molten hinokitiol is high and no particular external physical mixing is required. However, if the temperature is lower, then the fluidity will be lower and, in this case, it is preferred to homogenize the mixture by high-speed stirring or ultrasonic mixing. Normally we prefer to carry out the mixing at a temperature of from 50° to 70° C., preferably with high-speed stirring or ultrasonic mixing.

The cyclodextrin used in the present invention may be any of the α-, β- or γ forms. Although α-cyclodextrin and γ-cyclodextrin produce hinokitiol inclusion compounds having greater water-solubility than does β-cyclodextrin, β-cyclodextrin is easier to handle in the industrial production of inclusion compounds.

The organic liquid employed in the process of the present invention may be any organic liquid (preferably chosen from the general class of compounds known as "organic solvents") which is soluble in water and which does not form a strong inclusion compound with cyclodextrin. Examples of such liquids include: ketones such as acetone; lower alcohols, such as methanol, ethanol or isopropanol; and ethers such as tetrahydrofuran. The use of acetone is most preferred. Alcohols, which may also be used and which may be convenient to use, form a weak inclusion compound with cyclodextrin, which somewhat reduces the yield of included hinokitiol, but this may be acceptable for the convenience of using the alcohol. Although the organic liquid must be water-soluble, it is not always necessary to employ a liquid which is completely soluble in water in the amount employed.

The organic liquid must be cold relative to the mixture of hinokitiol with the aqueous solution of cyclodextrin to which it is added. The practical maximum temperature of the organic liquid depends upon the temperature of the mixture of hinokitiol and the aqueous solution of cyclodextrin; this temperature should be sufficiently low to reduce the temperature of the mixture of hinokitiol, aqueous solution and organic liquid effectively immediately to below the freezing point of water. In practice, in most cases, unless a very considerable (and wasteful) excess of organic liquid is employed, the organic liquid is preferably at a temperature not greater than $-10°$ C. The minimum temperature is determined by the freezing point of the organic liquid, since the temperature of the organic liquid must be above its freezing point; usually, a temperature within the range from $-40°$ C. to $-30°$ C. is preferred, as this is above the freezing point of all of the preferred organic liquids listed above.

In the process described above, it is believed that the inclusion compound is dehydrated by freezing of the water, simultaneously with insolubilization of the inclusion compound by the addition of the very cold organic liquid; the combination of these two events also prevents elution of the hinokitiol from the inclusion compound. The amount of organic solvent employed depends upon whether the α-, β- or γ- form of cyclodextrin is used and the concentration of the aqueous solution, but we prefer that the amount of organic solvent employed should be from 3 to 100, more preferably from 3 to 10, times the volume of the aqueous solution.

The inclusion compound formed can be collected from the mixture by conventional means, for example filtration (preferably aided by suction) or centrifugation. It can then be dried, e.g. by vacuum drying, and, if desired, pulverized to form a powder.

The amount of hinokitiol employed will normally not exceed equimolar with respect to the cyclodextrin and, in practice, it would not normally be of value to employ less than 1 mole of hinokitiol per 100 moles of the cyclodextrin; preferably, the molar ratio of cyclodextrin to hinokitiol is from 1:1 to 1:0.1, more preferably from 1:1 to 1:0.3.

Although the cyclodextrins are readily soluble in water, hinokitiol cannot easily be dispersed in water at $50°-70°$ C. to an extent greater than $5 \times 10^{-3}$ molar; accordingly, the preferred maximum concentration of the cyclodextrin in its aqueous solution will be determined by this and by the desired molar ratio of cyclodextrin to hinokitiol (preferably 1:1).

The resulting cyclodextrin inclusion compound is soluble in water even at relatively low temperatures, where hinokitiol is effectively insoluble. For example, at a temperature of 2° C., the solubilities of 1:1 molar α-, β- and γ-cyclodextrin inclusion compounds of hinokitiol are 1.29%, 0.2% and 0.7%, respectively, whereas the solubility of hinokitiol itself at such a temperature is unmeasurably small. Moreover, the antibacterial effect of hinokitiol was found to be preserved.

The invention is further illustrated by the following Examples.

EXAMPLE 1

1521.0 mg ($1.3 \times 10^{-3}$ mole) of β-cyclodextrin (manufactured by Nihon Shokukin Kako K. K. under the trade name Celdex N) were dissolved, with stirring, in 80 ml of water. and then 219.8 mg ($1.3 \times 10^{-3}$ mole) of hinokitiol were added to the resulting solution. This mixture was then heated, with stirring, to about 60° C., to prepare a homogeneous suspension, after which it was allowed to stand for 48 hours in a refrigerator at 5° C. and was then added to and mixed with 400 ml of acetone at $-35°$ C., with stirring. The liquid temperature rose to about $-28°$ C. Immediately upon mixing, a precipitate separated. This was collected by filtration under reduced pressure and then dried in a vacuum desiccator for 1 hour.

The resulting dry inclusion compound was ground to a powder in a mortar and then dissolved in water. The content of hinokitiol in the inclusion compound was determined by ultraviolet absorption (wavelength 245 nm). It was found that there were approximately equimolar amounts of cyclodextrin and hinokitiol in this compound; the actual molar ratio of cyclodextrin to hinokitiol was 1:0.94. The total yield of inclusion compound was 1568.5 mg and each 1 mg of this compound contained 0.120 mg of hinokitiol.

EXAMPLE 2

Following the procedure described in Example 1. 3278.4 mg ($3.3 \times 10^{-3}$ mole) of α-cyclodextrin (manufactured by Tokyo Kasei Kogyo K. K.) were dissolved, with stirring, in 61.5 ml of water, and then 184.4 mg ($1.1 \times 10^{-3}$ mole) of hinokitiol were added. The mixture was then treated as described in Example 1, except that the amount of acetone used was 3444 ml, to prepare an inclusion compound of hinokitiol in α-cyclodextrin. A total of 3181.5 mg of inclusion compound were obtained, each 1 mg containing about 0.052 mg of hinokitiol. There were, accordingly, about 3 moles of cyclodextrin per mole of hinokitiol; the actual molar ratio of cyclodextrin to hinokitiol was 1:0.38.

Details of the products of Examples 1 and 2 are given in Table 1. In the following Tables the abbreviation "CD" means "cyclodextrin" and the abbreviation "H" means "hinokitiol".

TABLE 1

|  | Example 1 | Example 2 |
|---|---|---|
| Amount of CD used in synthesis | 1521.0 mg | 3278.4 mg |
| Form of CD | β | α |
| Amount of H used in synthesis | 219.8 | 184.4 |
| Yield of inclusion compound | 1568.5 | 3181.5 |
| Amount of H in filtrate | 27.7 | 16.4 |
| Amount of H in 1 mg of inclusion compound | 0.120 | 0.052 |
| Amount of H in inclusion compound | 188.2 | 166.8 |
| Recovery of H substance | 85.6% | 90.4% |
| Molar ratio of CD:H in inclusion compound | 1:0.94 | 1:0.38 |
| Solubility (15° C.) | 0.3% | 13.1% |

COMPARATIVE EXAMPLES 1 AND 2

An equimolar mixture of β-cyclodextrin and hinokitiol (Comparative Example 1) and a mixture of α-cyclodextrin and hinokitiol in a molar ratio of 3:1 (Comparative Example 2) were prepared. These products and the products of Examples 1 and 2 were subjected to differential thermal analysis employing a differential scanning calorimeter in which the temperature rose at the rate of 10° C. per minute (4 mcal/second) to prepare differential thermal analysis diagrams. Whereas the diagrams for the products of Comparative Examples 1 and 2 showed endothermic peaks attributable to hinokitiol at 52° C., confirming the presence of free hinokitiol in the products of these Comparative Examples, no such peaks appeared in the diagrams for the products of Examples 1 and 2, indicating that (since hinokitiol had been confirmed by ultraviolet absorption spectroscopy to be present) the hinokitiol was in an inclusion form in the products of these Examples.

Hinokitiol has negligible solubility in water at 15° C., but the inclusion compound of Example 1 dissolves to the extent of 0.3% at 15° C. and that of Example 2 dissolves to the extent of 13.1% at 15° C.

EXAMPLE 3

The procedure of Example 1 was repeated, except that about 0.6 mole of hinokitiol was employed for each mole of γ-cyclodextrin. The resulting inclusion compound had a solubility of 0.9% in water at 15° C.

EXAMPLE 4

1521.4 mg ($1.3 \times 10^{-3}$ mole) of β-cyclodextrin were dissolved, with stirring, in 80 ml of water. 219.8 mg ($1.3 \times 10^{-3}$ mole) of hinokitiol were then added and the mixture was heated. When the mixture reached a temperature of about 50° C., the hinokitiol became oily and the mixture was homogenized in an ultrasonic homogenizer (frequency 20 kHz, power 60 W) for 30 minutes to prepare a homogeneous mixture.

This mixture was allowed to stand in a refrigerator at 5° C., after which it was treated as described in Example 1, to give an inclusion compound. Details of the compound are shown in Table 2.

EXAMPLE 5

1521.5 mg ($1.3 \times 10^{-3}$ mole) of β-cyclodextrin were dissolved, with stirring, in 80 ml of water. To the resulting solution were added 219.8 mg ($1.3 \times 10^{-3}$ mole) of hinokitiol, and the mixture was heated. When the temperature of the mixture reached about 50° C., the hinokitiol melted, and the mixture was subjected to forced agitation using a turbine blade (power 30 W, 800 r.p.m.) for 10 minutes to prepare a homogeneous mixture. The mixture was allowed to stand in a refrigerator at 5° C., and then treated as described in Example 1 to prepare an inclusion compound. Details of the inclusion compound are given in Table 2.

TABLE 2

|  | Example 4 | Example 5 |
|---|---|---|
| Amount of CD used in synthesis | 1521.4 mg | 1521.5 mg |
| Amount of H used in synthesis | 219.8 | 219.8 |
| Method of mixing | ultrasonic | forced agitation |
| Yield of inclusion compound | 1582.9 | 1581.0 |
| Amount of H in filtrate | 31.2 | 30.8 |
| Amount of H in 1 mg of inclusion compound | 0.117 | 0.113 |
| Amount of H in inclusion compound | 185.2 | 178.7 |
| Recovery of H substance | 84.6% | 81.6% |
| Molar ratio of CD:H in inclusion compound | 1:0.92 | 1:0.88 |
| Solubility (15° C.) | 0.3% | 0.3% |

COMPARATIVE EXAMPLE 3

The procedure described in Example 1 was repeated exactly, except that the acetone was replaced by hexane, also cooled down to −35° C. However, the amount of hinokitiol contained in the precipitate obtained was very small, probably because hexane forms a strong inclusion compound with cyclodextrins. The details are given in Table 3, in which, for ease of comparison, the corresponding details for Example 1 are also given.

TABLE 3

|  | Comparative Example 3 | Example 1 |
|---|---|---|
| Amount of CD used in synthesis | 1520.4 mg | 1521.0 mg |
| Amount of H used in synthesis | 219.6 | 219.8 |
| Yield of inclusion compound | 1024.0 | 1568.5 |
| Amount of H in filtrate | 145.5 | 27.7 |
| Amount of H in 1 mg of inclusion compound | 0.004 | 0.120 |
| Amount of H in inclusion compound | 4.8 | 188.2 |
| Recovery of H substance | 2.1% | 85.6% |
| Molar ratio of CD:H in inclusion compound | 1:0.03 | 1:0.94 |

TABLE 3-continued

| | Comparative Example 3 | Example 1 |
|---|---|---|
| Solubility (15° C.) | 0.3% | 0.3% |

We claim:

1. An inclusion compound of hinokitiol within a cyclodextrin the molar ratio of said cyclodextrin to said hinokitiol being from 1:1 to 1:0.1.

2. The compound as claimed in claim 1, wherein the cyclodextrin is α-cyclodextrin.

3. The compound as claimed in claim 1, wherein the cyclodextrin is β-cyclodextrin.

4. The compound as claimed in claim 1, wherein the cyclodextrin is γ-cyclodextrin.

5. The compound as claimed in claim 1, wherein said molar ratio is from 1:1 to 1:0.3.

6. The compound as claimed in claim 3, wherein the molar ratio of said β-cyclodextrin to said hinokitiol is from 1:1 to 1:0.3.

7. The compound as claimed in claim 1 wherein said molar ratio is 1:1.

8. A process for preparing an inclusion compound of hinokitiol within a cyclodextrin, the molar ratio of said cyclodextrin to said hinokitiol being from 1:1 to 1:0.1 which process comprises the steps:

forming a heated mixture of hinokitiol and an aqueous solution of a cyclodextrin at a temperature higher than the temperature at which hinokitiol melts, the molar ratio of said cyclodextrin to said hinokitiol being from 1:1 to 1:0.1;

mixing the heated mixture with a water-soluble organic liquid which is at a temperature not higher than −10° C. and which does not form an inclusion compound with the cyclodextrin or forms a weaker inclusion compound with the cyclodextrin than does hinokitiol, to precipitate said inclusion compound of hinokitiol within cyclodextrin; and separating the precipitated inclusion compound.

9. The process as claimed in claim 8, wherein the molten hinokitiol is physically dispersed within the aqueous solution of the cyclodextrin.

10. The process as claimed in claim 9, wherein the physical dispersion is by stirring.

11. The process as claimed in claim 9, wherein the physical dispersion is by ultrasonic mixing.

12. The process as claimed in claim 8, wherein said hinokitiol is added to a heated aqueous solution of the cyclodextrin.

13. The process as claimed in claim 8, wherein a mixture of hinokitiol and said aqueous solution is heated.

14. The process as claimed in claim 8, wherein the temperature of said heated mixture is at least 50° C.

15. The process as claimed in claim 14, wherein said temperature is from 50° to 70° C.

16. The process as claimed in claim 15, wherein the molten hinokitiol is physically dispersed within said aqueous solution by stirring or ultrasonic mixing.

17. The process as claimed in claim 8, wherein said organic liquid is selected from the group consisting of acetone, methanol, ethanol, isopropanol and tetrahydrofuran.

18. The process as claimed in claim 8, wherein said organic liquid is acetone.

19. The process as claimed in claim 8, wherein the temperature of said cold organic liquid is from −30° C. to −40° C.

20. The process as claimed in claim 8, wherein said cold organic liquid is acetone at a temperature of from −30° C. to −40° C.

21. The process as claimed in claim 8 wherein the molar ratio of said cyclodextrin to said hinokitiol is from 1:1 to 1:0.3.

22. The process as claimed in claim 21, wherein the temperature of said heated mixture is at least 50° C.

23. The process as claimed in claim 22, wherein the temperature of said cold organic liquid is from −30° C. to −40° C.

24. The process as claimed in claim 23, wherein said organic liquid is selected from the group consisting of acetone, methanol, ethanol, isopropanol and tetrahydrofuran.

25. The process as claimed in claim 23, wherein said organic liquid is acetone.

26. The process as claimed in claim 24, wherein said temperature of said heated mixture is from 50° to 70° C.

27. The process as claimed in claim 25, wherein said temperature of said heated mixture is from 50° to 70° C.

28. The process as claimed in claim 26 wherein said molar ratio is 1:1.

29. The process as claimed in claim 27 wherein said molar ratio is 1:1.

* * * * *